(12) United States Patent
Crepeau et al.

(10) Patent No.: US 6,852,332 B2
(45) Date of Patent: Feb. 8, 2005

(54) LIQUID VITAMIN COMPOSITION

(75) Inventors: Michel André Crepeau, Pueblo West, CO (US); Patrick De Lanty, Bourg-la-Reine (FR); Jean-Marie Dollat, Montluçon (FR); David Muysson, Saint-Nom-la-Breteche (FR)

(73) Assignee: Adisseo France S.A.S., Antony (FR)

( * ) Notice: Subject to any disclaimer, the term of this patent is extended or adjusted under 35 U.S.C. 154(b) by 0 days.

(21) Appl. No.: 10/239,503

(22) PCT Filed: Mar. 23, 2001

(86) PCT No.: PCT/EP01/03952

§ 371 (c)(1),
(2), (4) Date: Jan. 3, 2003

(87) PCT Pub. No.: WO01/70044

PCT Pub. Date: Sep. 27, 2001

(65) Prior Publication Data

US 2004/0018217 A1 Jan. 29, 2004

Related U.S. Application Data

(63) Continuation-in-part of application No. 09/590,804, filed on Jun. 9, 2000, now Pat. No. 6,329,423.

(30) Foreign Application Priority Data

Mar. 24, 2000 (EP) .............................................. 00106397

(51) Int. Cl.[7] .......................... A23K 1/18; A23K 1/165; A23L 1/30; B65D 83/04
(52) U.S. Cl. ......................... 424/438; 424/442; 426/72; 426/73; 206/538
(58) Field of Search ................................ 424/438, 442, 424/400, 119, 221; 426/72, 73; 206/538

(56) References Cited

U.S. PATENT DOCUMENTS 3,626,065 A * 12/1971 Maekawa et al. ........... 514/276
3,874,342 A * 4/1975 Kloss ........................... 119/71
3,914,419 A * 10/1975 Haeger et al. ................. 514/52
3,932,634 A 1/1976 Kardys ......................... 424/237
5,568,880 A * 10/1996 DiBartolomeo ............. 221/131
5,770,233 A * 6/1998 Kido et al. .................. 424/641

FOREIGN PATENT DOCUMENTS

| GB | 1191986 | 5/1970 |
| WO | WO 94/01088 | 1/1994 |
| WO | WO 97/27764 | 8/1997 |
| WO | WO 98/46090 | 10/1998 |

OTHER PUBLICATIONS

Derwent Publications Ltd., London, GB; AN 1983–762753, XP002172636 and RO 80 425 A (Pateur Inst Veterinare Feb. 28, 1983, Abstract.*

Derwent Publications Ltd., London, BG; AN 1984–253081, XP002172635 and JP 59152327 A (Otsuka Pharm Co Ltd), Aug. 31, 1984, Abstract.

Derwent Publications Ltd., London, GB; AN 1983–762753, XP002172636 and RO 80 425 A (Pasteur Inst Veterinare), Feb. 28, 1983, Abstract.

Gerhard N. Schrauzer, "An Evaluation of Liquid Vitamin–Mineral Supplement Technology," Journal of Medicinal Food, vol. 1, No. 3, , pp. 207–216 (1998).

Patent Abstracts of Japan, vol. 017, No. 617 (c–1129), Nov. 15, 1993 & JP 05 186343 A (Lion Corp), Jul. 27, 1993.

* cited by examiner

Primary Examiner—Thurman K. Page
Assistant Examiner—S. Tran
(74) Attorney, Agent, or Firm—Finnegan, Henderson, Farabow, Garrett & Dunner, L.L.P.

(57) ABSTRACT

A liquid vitamin composition comprising (a) a first liquid vitamin formulation comprising vitamins A, D3, B12 and optionally vitamin E, (b) a second liquid vitamin formulation comprising vitamins B1, B2, B3, B5, B6, and H, and (c) a third liquid vitamin formulation comprising vitamin K3 wherein the three formulations are separate solutions.

23 Claims, No Drawings

LIQUID VITAMIN COMPOSITION

This application is a U.S. national stage filing of International Application No. PCT/EP01/03952, filed on Mar. 23, 2001, which claims the benefit of priority to European Patent Application No. 00106397.3, filed on Mar. 24, 2000, and which is also a continuation in part of U.S. patent application No. 09/590,804, filed on Jun. 9, 2000, now U.S. Pat. No. 6,329,423.

The present invention relates to a liquid vitamin composition, and in particular to a composition comprising three or four liquid vitamin formulations.

Vitamins are introduced into animal feed to supplement the diet of the animal. The animal requires more than one particular vitamin and the vitamins are added as a vitamin mix, generally known as a vitamin pre-mix. A known method of introducing the mixture of vitamins into the diet is to incorporate the vitamins into the animal feed. This can be introduced in two ways. The most commonly used method is through the introduction of powdered vitamins by adding the powdered pre-mix to the feed ingredients. The resulting mixture is then formed into pellets. A problem with this method is that the process for forming the pellets required high temperature and high pressure. Under such conditions, some of the vitamins are unstable and can decompose.

Alternatively, vitamins can be supplied for addition to animal feed in the liquid form. A problem however associated with liquid vitamin mixtures is that in the liquid form, many vitamins are more reactive than in the solid form and often react with each other and in some cases decomposition of the vitamin results.

There remains, therefore, a need for an effective means of providing a mixture of vitamins which results in minimum loss in the quantity and quality of the vitamins. We have found a solution to the aforementioned problems through a three component liquid vitamin system wherein each of the three vitamin formulations are stable.

Accordingly, the present invention provides a liquid vitamin composition comprising (a) a first liquid vitamin formulation comprising vitamins A, D3, B12 and optionally vitamin E, (b) a second liquid vitamin formulation comprising vitamins B1, B2, B3, B5, B6 and H, and (c) a third liquid vitamin formulation comprising vitamin K3 characterised in that the three formulations are separate solutions.

The liquid composition of the present invention provides the advantage over the prior art in that the three separate vitamin formulations are stable in the liquid form. We have found that the specific mixture of vitamins in each formulation results in a stable formulation, thus providing a product which can be supplied as a three distinct component system whereby the formulations may be admixed at time of application. The resulting composition can be used to supply the vitamin needs of the animal without the problems associated with the prior art compositions.

The liquid composition comprises three separate formulations. The composition may be accommodated in a single container with three distinct compartments. Alternatively, the composition may be provided in three separate containers comprised within a common pack or packaging system which is appropriate for sale or delivery or merchandising. The container(s) may be of any size as appropriate for the required need and destination. Suitably, the container may be from 1 to 1000 liters in volume.

The liquid vitamin composition comprises a first liquid formulation comprising vitamins A, D3 and B12. These vitamins are suitably present as the oily derivative of the vitamin, such as the lower alkyl ester of the vitamin, for example the propionate such as vitamin A oil propionate. The first formulation may also optionally comprise vitamin E.

The concentration of each vitamin in the first liquid formulation may be varied to satisfy the specific requirements of the feed to which it is to be added. Suitably, vitamin A is present in an amount of from 100 to 750 MIU/kg, preferably from 100 to 400 MIU/kg. Suitably, vitamin D3 is present in an amount of from 10 to 300 MIU/kg, preferably from 10 to 250 MIU/kg. Suitably, vitamin B12 is present in an amount of from 0.1 to 1 g/kg, preferably from 0.2 to 0.8 g/kg. Where vitamin E is present in the formulation, this vitamin is present in an amount of from 45 to 600 g/kg, preferably from 200 to 450 g/kg.

The first liquid formulation is suitably in the non-aqueous phase and comprises at least one non-aqueous solvent. Suitable solvents include alkyl lactates e.g. ethyl lactate and butyl lactate and oils such as propane 1,2 diol, n-propyl alcohol, vegetable oils and soya oil. Preferably, the solvent is an alkyl lactate, especially ethyl lactate and butyl lactate.

The first liquid vitamin formulation may comprise an emulsifier. Suitable emulsifiers include ethoxylated castor oils such as polyethylene glycol monooleate 80 and polysorbitan monooleate 80.

The first liquid vitamin formulation may comprise an antioxidant. Suitably, the antioxidant may be selected from ethoxyquin, butyl hydroxy toluene, butyl hydroxy anisole and tertiary butyl hydroxyquinone. The preferred antioxidant is ethoxyquin.

The second liquid vitamin formulation of the present invention comprises a mixture of vitamins B1, B2, B3, B5, B6 and H. This formulation may also optionally comprise vitamin B9. It is preferred that this formulation is in the aqueous phase.

The concentration of each vitamin in the second liquid formulation also may be varied to satisfy the specific requirements of the feed to which it is to be added. Suitably, vitamin B1 is present in an amount of from 0.01 to 7 g/kg, preferably from 0.1 to 3 g/kg. Suitably, vitamin B2 is present in an amount of from 0.01 to 40 g/kg, preferably from 1 to 20 g/kg. Suitably, vitamin B3 is present in an amount of from 0.01 to 60 g/kg, preferably from 1 to 30 g/kg. Suitably, vitamin B5 is present in an amount of from 0.01 to 60 g/kg, preferably from 1 to 30 g/kg. Suitably, vitamin B6 is present in an amount of from 0.01 to 12 g/kg, preferably from 1 to 5 g/kg. Suitably, vitamin H is present in an amount of from 0.01 to 5 g/kg, preferably from 1 to 2 g/kg. Where vitamin B9 is present, it is present in an amount suitably of from 0.01 to 5 g/kg, preferably from 1 to 2 g/kg The second liquid formulation may comprise a stabilising agent and/or an anti-gelling agent. Suitable stabilising agents include inorganic salts such as potassium sorbate, sorbitol, propane 1,2 diol and glycerine. The preferred agents are sorbitol and propane 1,2 diol The second liquid formulation may comprise a suspension agent. Suitable suspension agents include polysaccharides such as sugars, xanthan gum and carageenan. The preferred suspension agent is xanthan gum.

The second liquid formulation may comprise an antioxidant. Suitable antioxidants are citric acid and ascorbic acid. The preferred antioxidant is ascorbic acid.

The second liquid formulation may also comprise a fungicide. Any suitable known fungicide may be used and in particular potassium sorbate is favored.

The third formulation of the present invention comprises vitamin K3. It is preferred that this vitamin, known as menadione, is complexed with an inorganic salt such as sodium bisulphite, the complex being known as MSBC; an organic compound such as nicotinamide bisulphite, the compound being known as menadione nicotinamide bisulphite. Equally possible, the vitamin may be physically protected by liason with a compound such as styramine, the resulting compound being known as menadione styramine.

Alternatively, vitamin K3 may be mixed with other vitamins to form a stable formulation. Such vitamins include vitamins A, D3, E and B12.

The concentration of vitamin K3 in the third formulation suitably may be from 1.5 to 20 g/kg, preferably from 5 to 10 g/kg.

The third formulation is suitably in the aqueous phase and may also comprise a stabilising agent and/or an anti-gelling agent. Suitable stabilising agents such as inorganic sodium salts, sorbitol or glycerine may be used. Preferably, the stabilising agent is sorbitol. Preferably, the anti-gelling agent is propane-1,2-diol.

With regard to the first formulation, when vitamin E is not present in this formulation, it is possible to include this vitamin in the composition as a separate formulation. This may form a fourth formulation and thus according to another aspect of the present invention there is provided a liquid vitamin composition comprising (a) a first liquid vitamin formulation comprising vitamins A, D3, and B12, (b) a second liquid vitamin formulation comprising vitamins B1, B2, B3, B5, B6 and H, (c) a third liquid vitamin formulation comprising vitamin K3, and (d) a fourth liquid vitamin formulation comprising vitamin E characterised in that the four formulations are separate solutions.

With regard to this four component system, the aforementioned properties apply equally for the first three formulations. With regard to the fourth formulation, this formulation is suitably an aqueous formulation and comprises the vitamin in an amount of at least 60% by weight, preferably from 60 to 70% by weight.

The fourth liquid vitamin formulation may comprise water and an emulsifier, a stabilising agent and a solvent as hereinbefore defined. The preferred formulation comprises vitamin E, potassium sorbate, propylene glycol, propanol and polyethylene glycol 400 monooleate.

The vitamin requirements of animals will of course vary from animal to animal and an advantage of the composition of the present invention is that the composition can be prepared to contain the desired concentration of vitamins in the three or four formulations to meet the specific requirements. In general, it is preferred that each of the first and second formulations contain up to 50% by of weight vitamins.

The liquid vitamin composition of the present invention is introduced into the diet of the animal by adding the liquid composition to the animal feed. Typically the feed supplied to animals is in the form of pellets or in the form of a mash feed. Where the vitamin composition is to be added to the pellets, the liquid vitamin compositions of the present invention may be introduced into the feed after formation of the pellets. Where the vitamin composition is to be added to the mash feed, the three or four formulations may be added into the mash feed. The resulting feed may then be mixed. The liquid vitamin compositions of the present invention may also me mixed with dry vitamins and the resulting mix then added to the feed.

The liquid vitamin compositions are suitably supplied as a three or four component system accommodated within a single container or a three or four separate containers accommodated within a single pack or packaging system. Thus, according to another aspect of the present invention there is provided a delivery system for animal feed comprising at least one set of containers, each set comprising a vitamin composition as herein before defined.

Where it is desired to add the liquid vitamin composition to the formed pellets or to the mash feed, this may be achieved by applying the liquid composition onto the pellet or the mash feed by any suitable means, for example by spraying, or pouring the liquid or by immersing or soaking the pellet in the liquid composition. Preferably, the liquid is applied to the pellet or mash feed by spraying. This may be carried out using any technique known in the art. The three or four liquid formulations may be sprayed separately, either simultaneously or in series. Alternatively, the three or four formulations may be admixed immediately prior to spraying.

The resulting feed pellet or mash feed comprises the desired vitamin supplement and according to another aspect of the present invention there is provided animal feed supplemented with vitamins said feed obtained by the addition to the feed a liquid vitamin composition as herein before described.

The present invention will now be described with reference to the following examples:

EXAMPLE 1

Three Component Composition 1.1. Preparation of the Liquid Vitamin Formulations 1.1.1 First Liquid Formulation A formulation as detailed in Table 1.1 below was prepared according to the following procedure:

Propane 1-2 diol was added to Vitamin B12 with stirring. The stirring was continues for five minutes to ensure even mixing. Butyl lactate was then added to the mixture, followed by soya oil. While continuing to stir the mixture, vitamin E was added. Ethoxyquin, vitamins A and D were then added to the homogeneous mixture. Finally, the castor oil was added to provide a homogeneous liquid.

TABLE 1.1

| COMPONENT | AMOUNT |
|---|---|
| Oil of Vitamin A | 120 MIU/kg |
| Oil of Vitamin D3 | 12 MIU/kg |
| Oil of Vitamin E | 298 g/kg |
| Vitamin B12 | 0.2 g/kg |
| ethoxyquin | 30 g/kg |
| soya oil | 64 g/kg |
| butyl lactate | 285 g/kg |
| propanel-2 diol | 47 g/kg |
| Ethoxylated castor oil | 200 g/kg |

1.1.2: Second Liquid Vitamin Formulation

A formulation as detailed in Table 1.2 below was prepared according to the following procedure:

An aqueous solution of water, propane 1-2 diol, sorbitol, ascorbic acid and xanthan gum was prepared in a 2 liter Becher™ mixer. The contents were stirred using a magnetic stirrer. The vitamins were introduced one at a time in the following order: H, B6, B5, B3, B1 and B2. The resulting mixture was mixed for 15 minutes

TABLE 1.2

| COMPONENT | AMOUNT (%) |
|---|---|
| Vitamin H (biotine) | 0.02 |
| Vitamin B6 (pyridoxine chlorohydrate) | 0.4 |
| Vitamin B5 (dexpanthénol) | 2.62 |
| Vitamin B1 thiamine mononitrate) | 0.26 |
| Vitamin B2 (riboflavin - 80%) | 1.05 |
| Vitamin B3 (niacinamide) | 7.86 |
| water | 74.3 |
| Propane-1,2-diol | 12.4 |
| sorbitol | 12.4 |

TABLE 1.2-continued

| COMPONENT | AMOUNT (%) |
|---|---|
| ascorbic acid | 0.1 |
| xanthan gum | 0.7 |

1.1.3: Third Liquid Vitamin Formulation

An aqueous solution comprising 725 g of water, 125 g of propane-1,2-diol and 125 g of sorbitol was prepared. 6 g of menadione sodium bisulphite complex was added to the solution with stirring. The resulting solution contained 2 g/liter of vitamin K3 expressed as pure menadione.

1.2: Stability Measurements

The stability of each formulation in the composition each was determined over a 4 weeks period. The concentration of vitamin in the formulation was analysed using standard analytical methods (high performance liquid chromatography). The formulations were stored at 40° C. over the test period. The results are given in Tables 1.3, 1.4 and 1.5 below:

TABLE 1.3

Stability of First Formulation

| VITAMIN | CONC at T = 0* | CONC at T = 2 weeks | CONC at T = 4 weeks |
|---|---|---|---|
| A | 120500 UI/g | 118500 UI/g | 120400 UI/g |
| D3 | 56200 UI/g | 56160 UI/g | 52800 UI/g |
| E | 27.6% | 29.1% | 29.3% |
| B12 | 0.0202% | 0.0165% | 0.0157% |

*T = 0 is stability measurements immediately after preparation

It can be seen from the results above that the vitamins are stable in the formulation.

TABLE 1.4

Stability of Second Formulation

| VITAMIN | CONC*. at T = 0** | CONC*. at T = 1 week | CONC*. at T = 3 weeks | CONC* at T = 2 weeks | CONC*. at T = 4 weeks |
|---|---|---|---|---|---|
| B1 | 0.265 | 0.245 | 0.263 | 0.253 | 0.248 |
| B3 | 8 | 7.98 | 7.85 | 7.8 | 8 |
| B5 | 2.63 | 2.64 | 2.64 | 2.65 | 2.69 |
| B6 | 0.355 | 0.32 | 0.333 | 0.33 | 0.329 |
| H | 0.021 | 0.022 | 0.021 | 0.02 | 0.021 |
| B2 | 1 | 1.08 | 1.04 | 1.04 | 1.01 |

*measured as g % g of solution

**T = 0 is stability measurements immediately after preparation

It can be seen from the results above that the vitamins are stable in the formulation.

TABLE 1.5

Stability Measurement of Vitamin K3

| VITAMIN | CONC* at T = 0 | CONC* at T = 2 weeks | CONC* at T = 4 weeks |
|---|---|---|---|
| K3 | 2.00 | 1.93 | 1.92 |

*measured as g % g of solution
**T = 0 is stability measurements immediately after preparation It can be seen from the results above that vitamins K3 is stable in the third liquid formulation.

EXAMPLE 2

Four Component Composition 2.1: Preparation of the Liquid Formulations
2.1.1: First Liquid Formulation A formulation as detailed in Table 2.1 below was prepared according to the following procedure:

Vitamin B12 was added to propane 1,2, diol. Propanol was then added to this mixture. In a separate container, the emulsifiers, ethyl lactate, ethoxyquin and the remaining oils of the vitamins were combined and mixed. The first mix was then added to the second mix and the resulting mixture mixed until homogenous.

TABLE 2.1

| COMPONENT | AMOUNT |
|---|---|
| Oil of Vitamin A(retinyl propionate) | 572 MIU/g |
| Oil of Vitamin D3 (4000) | 280 MIU/g |
| Pure Vitamin B12 | 0.46 MIU/g |
| Water | 50 g/kg |
| Propylene glycol | 50 g/kg |
| Propanol | 30 g/kg |
| Ethyl lactate | 50 g/kg |
| Alkamuls (PSMO-20) | 150 g/kg |
| Alkamuls (400-MO) | 279.8 g/kg |
| Ethoxyquin | 60 g/kg |

2.1.2: Second Liquid Formulation

A formulation as detailed in Table 2.2 below was prepared according to the following procedure:

The soluble B vitamins were added to water and mixed until dissolved. In a separate container, the suspending agent was added to propane 1,2, diol and mixed thoroughly. N-propyl alcohol was then added. The first mix was then added to the second mix with stirring. The riboflavin and folic acid were then added to complete the mixture and the resulting mixture stirred until a fine, uniform suspension was formed.

TABLE 2.2

| COMPONENT | AMOUNT (g/kg) |
|---|---|
| Vitamin H (biotin 95%) | 0.266 |
| Vitamin B6 (pyridoxine) | 9.5 |
| Vitamin B5 (D-CAL Pan) | 42 |
| Vitamin B1 (thiamine mono) | 6.3 |
| Vitamin B2 (80%) | 31 |

TABLE 2.2-continued

| COMPONENT | AMOUNT (g/kg) |
|---|---|
| Vitamin B3 (niacinamide 99%) | 116.4 |
| Vitamin B9 (folic acid) | 2.3 |
| Water | 650.8 |
| Potassium sorbate | 1 |
| Ascorbic acid | 0.28 |
| Methocel | 2.5 |
| Propanol | 50 |
| Propylene glycol | 80 |

2.1.3: Third Liquid Formulation

A formulation as detailed in Table 2.3 below was prepared by adding the Vitamin K3 salt to water and mixing until dissolved. N propyl alcohol and propane 1,2 diol were then added to the solution.

TABLE 2.3

| COMPONENT | AMOUNT (g/kg) |
|---|---|
| Vitamin K3 (MSBC 33%) | 16.5 |
| Water | 662.9 |
| Propan 1,2 diol | 50 |
| Sorbitol | 80 |
| Propylene glycol | 150 |

2.1.4: Fourth Liquid Formulation

A formulation as detailed in Table 2.4 below was prepared according to the following procedure:

Propylene glycol was mixed with propanol and potassium sorbate in water. In a separate container, the emulsifiers, ethyl lactate and the oil of the vitamin E were combined and mixed. The first mix was then added to the second mix and the resulting mixture mixed until homogenous.

TABLE 2.4

| COMPONENT | AMOUNT (g/kg) |
|---|---|
| Oil of Vitamin E | 454.5 |
| Water | 40 |
| Potassium sorbate | 1 |
| Propylene glycol | 40 |
| Propanol | 30 |
| Ethyl lactate | 50 |
| Alkamus PSMO-20 | 114.7 |
| Alkamus 400_MO | 243.3 |

2.2 Stability Measurements

The stability of each formulation in the composition was determined as in Example 1 and found to be as stable as that of Example 1.

EXAMPLE 3

Stability of the Liquid Vitamin Composition in a Poultry Feed

A standard poultry feed comprising a digestible carbohydrate, a source of fat, a source of amino acid, vitamins and minerals as detailed in Table 3.1 below was used in this example

TABLE 3.1

Poultry Feed Formulation

| COMPONENT | AMOUNT (g) |
| --- | --- |
| Corn | 65.6 |
| Soya bean meal | 28.5 |
| Oil | 2 |
| D,L methionine | 0.24 |
| L-Lysine, HCl | 0.11 |
| Calcium carbonate | 0.93 |
| di-calcium phosphate | 1.82 |
| Salt | 0.3 |
| Vitamin Composition | 0.5 |

Two sources of vitamin A are compared. Mixture A contained the vitamin composition in the liquid form according to the present invention whilst mixture B contained the conventional powdered vitamin composition. The vitamin pre-mixes were added to the feed. The stability of vitamin A in both feed samples was determined over a four weeks period. The feeds were stored at 20° C. and under 80% humidity. The concentration of vitamin A in the feed was measured using conventional analytical methods (high performance liquid chromatography). The results are given in Table 3.2 below:

TABLE 3.2

Concentration of Vitamin A in Poultry Feed

| WEEK | VITAMIN A CONCENTRATION in FEED CONTAINING MIXTURE A (IU/g) | VITAMIN A CONCENTRATION in FEED CONTAINING MIXTURE B(IU/g) |
| --- | --- | --- |
| 0 | 96 | 53 |
| 1 | 102 | 58 |
| 2 | 96 | 51 |
| 3 | 95 | 54 |
| 4 | 87 | 50 |

It can be seen from the results that vitamin A is as stable in the feed containing the liquid pre-mix as in the conventional powdered pre-mix.

EXAMPLE 4

Stability of the Liquid Vitamin Composition in a Poultry Feed

The stability of vitamins A, K3 and B2 in a flour based poultry feed is determined for a liquid pre-mix according to the present invention prepared according to Example 1 (Feed 1) and a powdered pre-mix (Feed 2 comparative example).

100 g of the feed comprised the following composition:

TABLE 4.1

| COMPONENT | WEIGHT (g) |
| --- | --- |
| corn | 55.62 |
| Soya cake | 23 |
| Meat starch | 9 |
| Calcium carbonate | 8.43 |
| Liquid fat | 3.15 |
| Salt | 0.33 |

TABLE 4.1-continued

| COMPONENT | WEIGHT (g) |
| --- | --- |
| Pre-mix | 0.2 |
| D,L Methionine | 0.17 |

The stability results are given in Table 4.2 below:

TABLE 4.2

| | FEED 1 Vit A IU/kg | FEED 1 Vit K3 mg/kg | FEED 1 Vit B2 mg/kg | FEED 2 Vit A IU/kg | FEED 2 Vit K3 mg/kg | FEED 2 Vit B2 mg/kg |
| --- | --- | --- | --- | --- | --- | --- |
| Theoretical Value | 4128 | 0.96 | 6 | 8600 | 2 | 6 |
| Value after 1 month | 4375 | 1.06 | 5.86 | 8540 | 2.07 | 4.68 |
| Rdt | 100 | 100 | 98 | 99 | 100 | 78 |

These results show that the vitamins in the liquid composition are stable even after one month and are comparable to the conventional powdered vitamin composition.

What is claimed is:

1. A liquid vitamin composition comprising
   (a) a first liquid vitamin formulation comprising:
      i) 100 to 750 MIU/kg of vitamin A,
      ii) 10 to 300 MIU/kg of vitamin D3,
      iii) 0.1 to 1 g/kg of vitamin B12 and
      iv) optionally vitamin E,
   (b) second liquid vitamin formulation comprising:
      i) 0.01 to 7 g/kg of vitamin B1,
      ii) 0.01 to 40 g/kg of vitamin B2,
      iii) 0.01 to 60 g/kg of vitamin B3,
      iv) 0.01 to 60 g/kg of vitamin B5,
      v) 0.01 to 12 g/kg of vitamin B6, and
      vi) 0.01 to 5 g/kg of vitamin H, and
   (c) a third liquid vitamin formulation comprising 1.5 to 20 g/kg of vitamin K3,
   wherein the three formulations are separate solutions accommodated with a single container with three distinct compartments.

2. A liquid composition as claimed in claim 1, in which the first formulation comprises at least one solvent.

3. A liquid composition as claimed in claim 2, in which the solvent is selected from alkyl lactates, propane 1,2 diol, n-propyl alcohol, vegetable oil and soya oil.

4. A liquid composition as claimed in claim 1, in which the first formulation comprises an emulsifier.

5. A liquid composition as claimed in claim 4, in which the emulsifier is an ethoxylated oil.

6. A liquid composition as claimed in claim 1, in which the first formulation comprises an antioxidant.

7. A liquid composition as claimed in claim 6, in which the antioxidant is selected from ethoxyquin, butyl hydroxy toluene, butyl hydroxy anisole and tertiary butyl hydroquinone.

8. A liquid composition as claimed in claim 1, in which the second formulation further comprises vitamin B9.

9. A liquid composition as claimed claim 1, in which the second formulation is in the aqueous phase.

10. A liquid composition as claimed in claim 1, in which the second formulation comprises a stabilizing agent.

11. A liquid composition as claimed in claim 10, in which the stabilizing agent is sorbitol.

12. A liquid composition as claimed in claim 1, in which the second formulation comprises a suspension agent.

13. A liquid composition as claimed in claim 12, in which the suspension agent is a xanthan gum.

14. A liquid composition as claimed in claim 1, in which the second liquid composition comprises an antioxidant.

15. A liquid composition as claimed in claim 14, in which the antioxidant is selected from citric acid and ascorbic acid.

16. A liquid composition as claimed in claim 1, in which vitamin K3 of the third formulation is complexed to sodium bisulphite or nicotinamide bisulphite.

17. A liquid vitamin composition comprising
  (a) a first liquid vitamin formulation comprising:
    i) 100 to 750 MIU/kg of vitamin A,
    ii) 10 to 300 MIU/kg of vitamin D3, and
    iii) 0.1 to 1 g/kg of vitamin B12
  (b) a second liquid vitamin formulation comprising:
    i) 0.01 to 7 g/kg of vitamin B1,
    ii) 0.01 to 40 g/kg of vitamin B2,
    iii) 0.01 to 60 g/kg of vitamin B3,
    iv) 0.01 to 60 g/kg of vitamin B5,
    v) 0.01 to 12 g/kg of vitamin B6, and
    vi) 0.01 to 5 g/kg of vitamin H,
  (c) a third liquid vitamin formulation comprising 1.5 to 20 g/kg of vitamin K3, and
  (d) a fourth liquid vitamin formulation comprising 45 to 600 g/kg of vitamin E,
wherein the four formulations are separate solutions accommodated within a single container with four distinct compartments.

18. An animal feed supplemented with vitamins, said feed comprising a liquid vitamin composition as claimed in claim 1.

19. A delivery system for animal feed comprising at least one set of container, each container comprising a vitamin composition as claimed in claim 1.

20. The liquid vitamin composition according to claim 1, wherein the first liquid vitamin formulation comprises:
  i) 100 to 400 MIU/kg of vitamin A,
  ii) 10 to 250 MIU/kg of vitamin D3,
  iii) 0.2 to 0.8 g/kg of vitamin B12 and
  iv) optionally vitamin E;
wherein the second liquid vitamin formulation comprises:
  i) 0.1 to 3 g/kg of vitamin B1,
  ii) 1 to 20 g/kg of vitamin B2,
  iii) 1 to 30 g/kg of vitamin B3,
  iv) 1 to 30 g/kg of vitamin B5,
  v) 1 to 5 g/kg of vitamin B6, and
  vi) 1 to 2 g/kg of vitamin H; and
wherein the third liquid vitamin formulation comprises 5 to 10 g/kg of vitamin K3.

21. The liquid vitamin composition according to claim 17, wherein the first liquid vitamin formulation comprises:
  i) 100 to 400 MIU/kg of vitamin A,
  ii) 10 to 250 MIU/kg of vitamin B3, and
  iii) 0.2 to 0.8 g/kg of vitamin B12;
wherein the second liquid vitamin formulation comprises:
  i) 0.1 to 3 g/kg of vitamin B1,
  ii) 1 to 20 g/kg of vitamin B2,
  iii) 1 to 30 g/kg of vitamin B3,
  iv) 1 to 30 g/kg of vitamin B5,
  v) 1 to 5 g/kg of vitamin B6, and
  vi) 1 to 2 g/kg of vitamin H;
wherein the third liquid vitamin formulation comprises 5 to 10 g/kg of vitamin K3; and
wherein the fourth liquid vitamin formulation comprises 200 to 450 g/kg of vitamin E.

22. The liquid vitamin composition according to claim 1, wherein the first liquid vitamin formulation comprises:
  i) 120 MIU/kg of vitamin A,
  ii) 12 MIU/kg of vitamin D3,
  iii) 0.2 of vitamin B12 and
  iv) 298 g/kg of vitamin E;
wherein the second liquid vitamin formulation comprises:
  i) 0.26% of vitamin B1,
  ii) 1.05% of vitamin B2,
  iii) 7.86% of vitamin B3,
  iv) 2.62% of vitamin B5,
  v) 0.4% of vitamin B6, and
  vi) 0.02% of vitamin H; and
wherein the third liquid vitamin formulation comprises 2 g/L of vitamin K3 (expressed as pure menadione).

23. A liquid vitamin composition comprising
  (a) a first liquid vitamin formulation comprising:
    i) 572 MIU/kg of vitamin A,
    ii) 280 MIU/kg of vitamin D3, and
    iii) 0.46 g/kg of vitamin B12;
  (b) a second liquid vitamin formulation comprising:
    i) 6.3 g/kg of vitamin B1,
    ii) 31 g/kg of vitamin B2,
    iii) 116.4 g/kg of vitamin B3,
    iv) 42 g/kg of vitamin B5,
    v) 9.5 g/kg of vitamin B6, and
    vi) 0.266 g/kg of vitamin H;
  (c) a third liquid vitamin formulation comprising 16.5 g/kg of vitamin K3; and
  (d) a fourth liquid vitamin formulation comprising 454.5 g/kg of vitamin E
wherein the four formulations are separate solutions accommodated within a single container with four distinct compartments.

* * * * *

UNITED STATES PATENT AND TRADEMARK OFFICE
CERTIFICATE OF CORRECTION

PATENT NO. : 6,852,332 B2  
DATED : February 8, 2005  
INVENTOR(S) : Michel André Crepeau et al.

It is certified that error appears in the above-identified patent and that said Letters Patent is hereby corrected as shown below:

Column 10,  
Line 41, "with a" should read -- within a --.  
Line 62, "claimed claim" should read -- claimed in claim --.

Column 11,  
Line 37, "container, each container" should read -- containers, each set --.

Column 12,  
Line 4, "B3," should read -- D3, --.  
Line 23, "0.2 of" should read -- 0.2 g/kg of --.

Signed and Sealed this

Twenty-fourth Day of May, 2005

JON W. DUDAS  
*Director of the United States Patent and Trademark Office*